Aug. 14, 1962 W. P. STEPHENS 3,049,652
WARD-LEONARD CONTROL AUTOTRANSFORMER CIRCUIT
Filed June 18, 1958
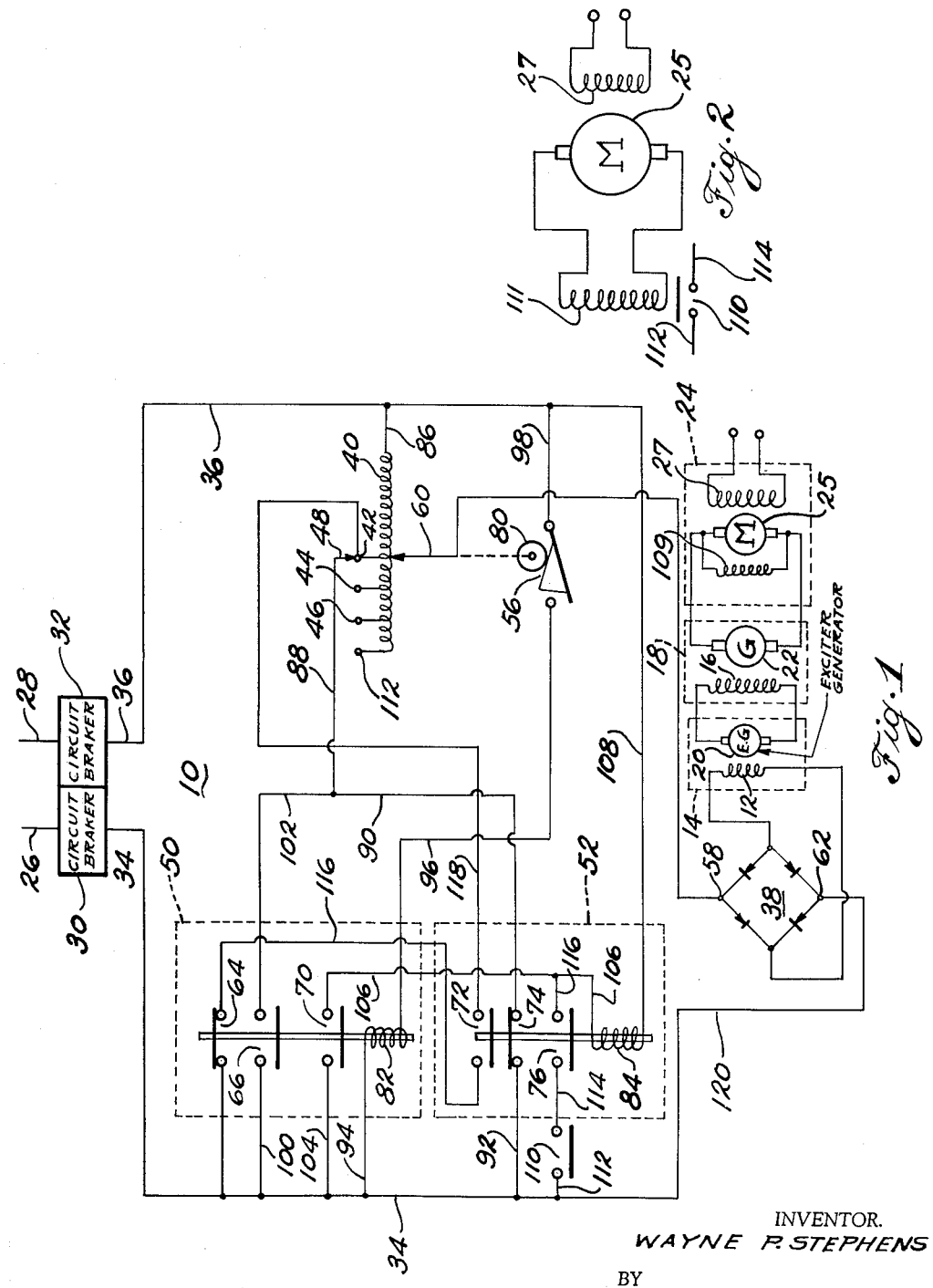
INVENTOR.
WAYNE P. STEPHENS
BY
RICHEY, WATTS, EDGERTON,
McNENNY & FARRINGTON.
ATTORNEYS

United States Patent Office 3,049,652
Patented Aug. 14, 1962

3,049,652
**WARD-LEONARD CONTROL AUTOTRANS-
FORMER CIRCUIT**
Wayne P. Stephens, Springfield, Ohio, assignor to The
White Motor Company, Cleveland, Ohio, a corporation of Ohio
Filed June 18, 1958, Ser. No. 742,915
12 Claims. (Cl. 318—152)

This invention relates to variable speed electromotive drive systems of the type employing a variable output generator energizing a drive motor, and more particularly relates to control circuit means for controlling excitation of the generator field in accordance with speed requirements of the motor to achieve quick and effective speed control of the motor.

Although this invention is readily adaptable for use in controlling motors used in many different applications, for simplicity, the same will be described with reference to its particular applicability in controlling the speed of motors used in oil well drilling and functions related or ancillary thereto. In such operations, power is required for four primary purposes, viz., operating a main hoist for raising and lowering the drill stem with respect to a drilled hole in which operation power over a wide range of speeds and torques is required, operating the sand reel over a wide range of speeds but at lower and less critical torque requirements, operating the drilling table for rotating the drill over a relatively wide range of speeds and torques and operating the cat shaft for tightening or loosening pipe joints and various other utility operations for which the cat shaft must always be driven at one of several, relatively low and fairly constant, predetermined speeds.

Power for each of these operations may be derived from one or more electric motors selectively operable to provide the different speeds and torques required. However, since operation of the motor at different speeds for different operations becomes intermittently necessary, it is important and advantageous to quickly and easily effect such a speed change. In particular, due to the large inertia of the drive motor, it is important to quickly reduce the motor speed to catheading speeds after operation at higher speeds for other operations.

It is the usual practice in systems of the type herein considered, to reduce motor speed by dynamic braking wherein the generator voltage is reduced to a point corresponding to catheading speed of the motor and the counter electromotive force of the motor exceeds the generated voltage of the generator. The motor speed is reduced by the load imposed on the motor forcing current through the generator by the excess counter electromotive force of the motor over the generated potential of the generator. Accordingly, if the controller is not brought to a zero position wherein the generated voltage of generator is brought to a minimum value, full dynamic braking is not applied to the motor, and due to the high inertia of the motor, time is lost in reducing the speed thereof.

Accordingly, it is a primary object of this invention to provide in a system, as herein described, an improved motor control circuit facilitating a quick change in motor speeds for different operations of the motor. For operation of the motor at a specific catheading speed after operation at a higher speed for other operations, the motor speed is reduced by full dynamic braking to a low value after which it is automatically increased to the desired catheading speed determined by preset controls. Pursuant to this objective and in accordance with this invention, the control circuit includes an auto transformer winding, a portion of which is electrically energized and used to control motor speed and output for certain functions such as hoisting, another portion of which is used to control a different function of the motor, such as catheading and novel means for either separately utilizing either of the controls or for operating the motor at hoisting speeds with the catheading control preset to operate the motor at a catheading speed when activated, whereby bringing the hoisting control to its "off" position automatically initiates events for operating the motor at a specific catheading speed. For catheading, several discrete taps to the winding are provided for selecting different predetermined speeds.

It is another object of this invention to provide a motor control circuit that is simple in construction and operation and reliable and effective in operation. By the novel and judicious combination of a minimum of commercially available components, such a circuit is achieved with consequent economy in construction and operation.

Other and further objects and advantages will become apparent from a perusal of the following detailed description taken in conjunction with the accompanying drawing in which:

FIGURE 1 represents schematically the motor control circuit of the invention; and FIGURE 2 represents schematically the speed sensitive relay forming a part of the circuit shown in FIGURE 1 and connected to the motor of the circuit.

Referring now more particularly to FIGURE 1 of the drawing for a detailed description of the invention, 10 represents generally a control circuit for regulating the current flow through a field winding 12 of an exciter generator 14, and 16 represents the field winding of a generator 18 receiving current from the armature 20 of the exciter generator 14. The armature 22 of generator 18 supplies current to a main drive motor 24 having an armature 25 and a separately and constantly excited field winding 27, used for supplying power to the driving apparatus. Each of the generators and motor is shunt wound and the generators are driven by a suitable diesel, steam or other engine (not shown), preferably at a constant speed.

A source of commercially available electrical power at 60 cycles and 115 volts is supplied through lines 26 and 28 through suitable current limiting circuit breakers 30 and 32 to a pair of lines 34 and 36. Circuit 10 includes a full wave, bridge rectifier circuit 38 having rectifier elements of any suitable type, for rectification of alternating current and application of direct current to field 12 of exciter generator 14, and further includes an auto transformer 40, commercially available under the name Variac, which is provided with spaced taps 42, 44 and 46 intermediate the end terminals of the winding for engagement by an arm 48, a pair of relays 50 and 52 and limit switch 56 for controlling the potential applied to a terminal 58 of rectifier 38 through transformer arm 60, with respect to the other diagonal terminal 62 of the rectifier which is connected directly to the line 34.

In an initial, "off" condition of the motor and system, the components and parts thereof assume positions as shown in the drawing in FIGURE 1, wherein the sets of contacts 64, 66 and 70 of relay 50 are closed, open and open, respectively, contacts 72, 74 and 76 of relay 52 are open, closed and open, respectively, switch 56 is held open by mechanical means shown at 80 and coupled to arm 60 which is at its "off" position in direct contact with tap 42. Relay solenoids 82 and 84 of relays 50 and 52, respectively, are deenergized. Energization of either of these solenoids is effective to close the normally open contacts of the relay and to open the normally closed contact thereof.

In the circuit, as shown in the initial condition thereof, line potential is applied across the portion of the winding of transformer 40 from tap 42 to an end 86 connected to line 36 since arm 48 is connected to line 34 through line connections 88 and 90, normally closed contacts 74 and line 92. In the movement of arm 60 from its "off" position, as shown, toward end 86 of the transformer 40 to start motor 24 for operations such as hoisting, the potential applied to rectifier 38 is increased, as hereinabove explained, to increase the exciter and generator currents and the speed of the motor 24, and switch 56 is closed whereby solenoid 82 is energized through lines 94, 96 and 98 connecting solenoid 82 and switch 56 in series between lines 34 and 36. Accordingly, contacts 66 are closed to maintain line power applied to arm 48 through lines 100, 102 and 88, and contacts 70 are closed to energize solenoid 84 of relay 52 through lines 104, 106 and 108 connecting the solenoid between the lines 34 and 36 to close relay 52. As shown in FIGURE 2 of the drawing, as well as in FIGURE 1, a relay 109 having a set of contacts 110 connected between line 34 and a contact of set 76 and having a solenoid 111 connected across the terminals of the armature 25 of motor 24 is provided. Relay 109 is so constructed that contacts 110 open only upon the impression of less than a predetermined potential across the solenoid 111. Since the field winding 27 of motor 24 is separately and constantly excited, the potential across the terminals of armature 25 varies directly with the angular speed thereof. Accordingly, relay 109 is speed sensitive to close upon the attainment of a certain armature speed and to open at speeds lower than that speed. Contact set 110 being automatically closed in response to any appreciable motor speed, solenoid 84 of relay 52 is maintained energized through contacts 110, contacts 76 and lines 112, 114, 116, 106 and 108. Under these conditions, as long as the motor rotates at any appreciable speed, the contacts 110 remain closed and the speed of motor is controllable by the position of arm 60 along the portion of the transformer winding between the tap 42 and end 86.

When it is desired to stop motor 24, arm 60 is returned to its "off" position at tap 42 wherein the mechanical connection to the arm opens switch 56 to interrupt the flow of energizing current to solenoid 82. Accordingly, no energizing current flows to the exciter field 12 and generator field 16 is deenergized. Relay 50 is also deenergized and contact set 64 is closed and contact sets 66 and 70 are opened. Relay solenoid 84, however, remains self-energized through its contact set 76 and contact set 110 since the system has sufficient rotational inertia to maintain the contact set 110 closed. Under these conditions, the motor 24 supplies power to the generator armature circuit and since the generated voltage of the generator is of a very low value, and since this circuit is of very low resistance, the motor is rapidly braked to a very low speed until the relay contacts 110 open due to the low motor speed to deenergize solenoid 84 to open relay 52.

Assuming now that the circuit is initially in the condition, shown in FIGURE 1 of the drawing, and that it is desired to operate the motor at a specific catheading speed, it is necessary only to position arm 48 to contact one of the transformer taps 44 or 46 or the end terminal 112. For illustration purposes, it is assumed that the arm 48 contacts tap 46. In this position of arm 48, exciter field 12 is energized through rectifier 38 since winding of transformer 40 is energized through line 92, contact set 74, lines 90 and 88, arm 48 and taps 46. Also, potential existing across the portion of the winding of transformer 40 between tap 46 and tap 42 is applied to rectifier 38. The potential existing across this portion of the winding bears the same ratio to line voltage existing across lines 34 and 36 as this length of the winding bears to the length of the winding between tap 46 and line 36. Accordingly, a predetermined value of potential is applied to the exciter field to provide a predetermined value of field current excitation. The motor 24 is therefore driven at a preselected constant speed suitable for catheading operations. For catheading operations at other speeds, the arm 48 may be moved to contact tap 44 or terminal 112. Also, to shut off the motor after catheading, it is necessary only to return arm 48 to tap 42 whereby no exciting current flows in exciter field 12.

For operation of the motor at catheading speeds following operation thereof at a hoisting speed, provision is made for automatic full dynamic braking of the motor for speed reduction to a very low value followed by automatic increase to catheading speeds. Arm 48 is positioned to contact the tap 44 or 46 or terminal 112 corresponding to the catheading speed desired after the hoisting operation is completed. As hereinabove described, the motor under these conditions is driven at some predetermined speed. For further control for hoisting, arm 60 may be moved toward end 86 or to any point between tap 42 and end 86 to provide greater field excitation and motor speed. As also explained, hereinabove, when arm 60 is moved away from its "off" position at tap 42, switch 56 is closed to energize firstly, solenoid 82 of relay 50 and secondly, solenoid 84 of relay 52. Under the energized condition of relays 50 and 52, line potential is applied across winding 40 between the tap contacted by arm 48 and end 86 since contacts 66 of relay 50 are closed and exciter field current is derived across the portion of winding 40 between the tap contacted by arm 48 and arm 60. The motor may be operated under these conditions for hoisting operations.

When the hoisting operation is completed, however, arm 60 is manually returned to its "off" position wherein it opens switch 56 to deenergize solenoid 82. Accordingly, contacts 66 open to remove line 34 from arm 48. Under these circumstances solenoid 84, however, remains energized since contacts 110 remain closed due to the inertial motion of the motor and since contacts 76 of relay 52 are also held closed. Tap 42, arm 60 and terminal 53 are maintained at zero potential with respect to terminal 62 since each of these terminals is connected to line 34 through contact sets 64 and 72 and lines 116 and 118, on the one hand, and line 120 on the other hand. Accordingly, the exciter field 12 receives no excitation and generator 18 provides a low resistance to motor 24 to effect full dynamic braking of the motor. When the motor speed reduces to a very low value, wherein contacts 110 open, relay solenoid 84 becomes deenergized and the contact set 74 thereof returns to its normally closed position to apply line potential across the portion of the winding of transformer 40 between the tap contacted by arm 48 and end 86. The exciter field then is excited for catheating in the manner described hereinabove, and the motor is accelerated to such speed.

It is to be understood that the present invention is readily applicable to a wide variety of systems including those where no exciter generator is employed, systems where a resistor, rather than winding of an autotransformer, may be employed and others wherein similar inventive features of this invention are involved.

I claim:

1. A control circuit for controlling energization of the field winding of an exciter generator comprising an auto transformer and means for electrically energizing the same with alternating current, means including a variable tap positionable along a portion of said transformer for selecting any potential within a range of potentials, said variable tap being movable on said transformer from an OFF position to a position providing a selected potential, means including a rectifier for applying said selected potential to said field winding for unidirectional energization thereof, means including spaced taps along another portion of said transformer for selecting predetermined potentials, said last mentioned means including connector arm means movable from said OFF position to a position at one of said spaced taps to provide a predetermined potential, means for selectively applying said predetermined potential to said rectifier to apply predetermined energization to said exciter field winding in addition to energization of said field winding from said selected potential and no potential being applied to said field winding when both said variable tap and said connector arm means are positioned at their OFF position.

2. A control circuit for controlling the energization of a field winding of an exciter generator comprising an auto transformer winding having a plurality of spaced taps along a first portion thereof, the transformer including one arm positionable to engage a selected one of said taps, the transformer including another arm positionable to engage other portions of said transformer winding, a first relay having sets of contacts and a solenoid energizable for closing the same, a second relay having a set of contacts and a solenoid energizable for opening the same, an alternating electrical power source having a pair of lines, said one arm being connected to a contact of a set on said first relay and to a contact on the set on said second relay, the other contact of each of said sets being connected to one of said power lines, said transformer winding being connected to the other of the power lines, means for automatically energizing said second relay solenoid in response to actuation of said first relay, means on said second relay for maintaining the same energized, switch means actuable by said other arm for controlling energization of the solenoid of said first relay and means including a rectifier connected to the transformer for applying the potential between said arms to the field winding of said generator.

3. A control circuit for controlling the energization of a field winding comprising an auto transformer winding including a first portion and an adjacent second portion having a plurality of spaced taps, one of said taps being connected to a point between said portions, a first arm engageable with any point of said first portion and a second arm engageable with any one of said taps, a first relay having a solenoid and sets of contacts closable by energization of said solenoid and a second relay having a solenoid and a first set of contacts opened and a second set of contacts closed by energization of the solenoid thereof, said first arm being connected to a contact of a set on said first relay and to a contact of said first set on said second relay, a contact of another set on said first relay being connected to a contact of the second set and to a terminal of the solenoid on said second relay, an alternating power source having a pair of lines, each of the other contacts of each of said sets and a terminal of the solenoid of said first relay being connected to one of said lines, a switch actuable to be closed by movement of said first arm away from said point and having terminals connected to the other terminal of the solenoid of said first relay and to said other line, the remaining end of said transformer winding being connected to said other line and rectifier means for rectifying the potential between said one arm and said one line to apply a preselected unidirectional current flow to said field winding.

4. A motor control circuit for controlling the speed of a motor energized by a generator having its field winding excited by an exciter generator comprising an auto transformer winding with a first portion having one end connected to a line of a power source and a second portion adjacent to a first portion having a plurality of spaced taps, a first arm movable to engage any point along said first portion and a second arm movable to engage any one of said taps, first relay means including a solenoid and switch means actuable by movement of said second arm away from said second portion for connecting said solenoid between said lines, a second relay having a solenoid, said first relay being actuable by energization of the solenoid thereof to energize the solenoid of the second relay and to connect said second arm to one of said lines, contacts on said second relay for maintaining the solenoid thereof energized and means coupled to said motor and responsive to the speed thereof for deenergizing the solenoid of said second relay when said first relay is deactuated and the speed of said motor is decreased below a predetermined value and means rectifying the potential between said second arm and said first line for excitation of the field winding of said exciter generator.

5. A motor control circuit for controlling the speed of a motor energized by a generator having its field winding energized by an exciter generator having a field winding comprising an impedance means having a first portion with one end connected to one line of a power source and the other end joined to another portion of the impedance means, said other portion having a tap at said junction and a plurality of other spaced taps therealong, rectifier means for rectifying the voltage between the other of the power lines and any point along the first portion of said impedance means and applying the same to said exciter field winding, means selectively connecting said other line to one of said taps and including a first relay actuable in response to movement of said first arm away from said junction, a second relay having means for connecting said other line to said second arm in the deactuated condition thereof and being actuable in response to actuation of said first relay, whereby the excitation of said field windings and the speed of said motor may be variably controlled by said first arm and predetermined by the position of said second arm on said taps.

6. A motor control circuit for controlling the speed of a motor energized by a supply generator with its field winding energized by an exciter generator having a field winding, comprising a pair of power lines and impedance means having one end coupled to one of said power lines, means for rectifying the potential between said other power line and any point along a portion of said impedance and applying the same to the field winding of said exciter generator, means selectively applying the other line to any one of a plurality of predetermined points along said impedance and including a pair of relays, a first of said relays being actuable by switch means responsive to selection of a potential on said impedance higher than the potential of said point for establishing a connection between said other line and one of said predetermined points, the second of said relays being actuable in response to actuation of said first relay for interrupting a connection between said line and one of said predetermined points, means on said second relay for maintaining the same actuated in response to actuation thereof, means responsive to sufficient deceleration of said motor at low speed to interrupt actuation of said second relay whereby the deactuation of said second relay is effective to reestablish the connection between said other line and one of said predetermined points.

7. In a mechanism having an electric motor, a power generator to energize the motor and an exciter generator connected to the field of the power generator the combination of, a variable transformer connected to one side of an A.C. source and having a control winding, a rectifier connected to the transformer and to the field of the exciter generator to provide rectified potential to the exciter field proportional to potential supplied by the transformer, said transformer including a first arm contactable with a first portion of the transformer winding to provide infinite potential variation between off and full on positions, said transformer including a series of taps on a second portion of said winding and another arm selectively connectable to the taps one at a time, switch means for selectively connecting at least a selected one of said arms and a part of the associated portion determined by the position of the arms to the other side of the A.C. source, and control means connected to said switch means and said motor and responsive to the speed of the motor maintaining the switch means in a position when said first arm is shifted from an on position to the off position and the motor is rotating above a predetermined speed whereby to maintain the exciter generator de-energized and thereby dynamically brake the motor below such predetermined speed before said second arm is connected to the excitor field.

8. The device of claim 7 wherein the control means is a solenoid actuated switch.

9. The device of claim 7 wherein the switch means includes first and second solenoid actuated switches each having a normal position and an energized position, wherein said second arm is connected to the exciting field when the switches are in the normal position, wherein said first switch is energized when the first arm is in an on position, wherein said second switch is energized by the first switch when the first is energized, and wherein said control means is series connected to a contact of said second switch and the second switch solenoid to maintain the second switch in an open condition when the motor is operating above said predetermined speed.

10. In a mechanism having an electric motor, a power generator to energize the motor and an exciter generator connected to the field of the power generator the combination of, a variable transformer connected to an A.C. source and having a control winding, a rectifier connected to the transformer and to the field of the excitor generator to provide rectified potential to the excitor field proportional to potential supplied by the transformer, said transformer including a first arm movable from an off position intermediate the ends of the winding along one portion of the winding to one end thereof, the transformer also including a plurality of taps along the remaining portion of the winding and a second arm connectable to the taps one at a time, first and second solenoid actuated switch means, a switch actuated into a de-energized position when said first arm is in the off position and connected to the first switch means to energize the first switch when the first arm is in an on position, said second switch means being moved to an energized position when said first switch means is energized, means to hold said second switch means in an open position when the motor is operating above a predetermined speed and the switch has been energized, a rectifier connected to the excitor generator field, said first arm and a part of said one portion of said winding determined by the position of the first arm being connected to one side of said rectifier when the arm is in an on position; lines connecting the transformer winding at the off position to the other side of the rectifier when the first switch means is not energized, the second switch means is energized, and the first arm is in the off position; and both of said arms and a selected part of said other portion of the winding being connected to said rectifier when neither switch means is energized.

11. In a motor control system including a main generator supplying power to the motor and an exciter generator having a field winding for controlling the power output of the main generator, the combination of, an autotransformer, means energizing said autotransformer, connector arm means positionable along a spaced tap portion of said autotransformer to provide a predetermined first potential, first circuit means connected to said connector arm means and to said field winding for energizing said field winding with said predetermined first potential to cause said motor to run at a predetermined first speed, variable tap means positionable along another portion of said autotransformer to provide a selected second potential, second circuit means connected to said variable tap means and to said field winding for energizing said field winding with said selected second potential in addition to said predetermined first potential to cause said motor to run at a second speed, and no potential being supplied to said field winding when said connector arm means and said variable tap means are positioned mutually adjacent one another on said autotransformer.

12. In a motor control system including a main generator supplying power to the motor and an exciter generator having a field winding for controlling the power output of said main generator the combination of an autotransformer, means energizing said autotransformer, connector arm means positionable along a portion of said autotransformer to provide a predetermined first potential, first circuit means connected to said connector arm means and said field winding for energizing said field winding with said first potential to cause said motor to run at a predetermined first speed, variable tap means positionable along another portion of said autotransformer from an OFF position to a position providing a selected second potential, second circuit means connected to said variable tap means and said field winding for energizing said field winding with said second potential in addition to said first potential to cause said motor to run at a second speed, control means being responsive to said motor speed and completely deenergizing said field winding when said variable tap means is moved to said OFF position, and said field winding remaining completely deenergized during deceleration of said motor from said second speed to substantially said first speed so that maximum dynamic braking of said motor is always provided during the deceleration period.

References Cited in the file of this patent

UNITED STATES PATENTS

| | | |
|---|---|---|
| 2,137,216 | McCarty | Nov. 15, 1938 |
| 2,179,353 | Schmutz et al. | Nov. 7, 1939 |
| 2,210,688 | Schmutz | Aug. 6, 1940 |
| 2,695,353 | Witschonke | Nov. 23, 1954 |

FOREIGN PATENTS

| | | |
|---|---|---|
| 499,297 | Belgium | Mar. 1, 1951 |
| 596,671 | Great Britain | Jan. 8, 1948 |
| 669,854 | Great Britain | Apr. 9, 1952 |